United States Patent
Halimi et al.

[11] Patent Number: 5,560,208
[45] Date of Patent: Oct. 1, 1996

[54] MOTOR-ASSISTED VARIABLE GEOMETRY TURBOCHARGING SYSTEM

[76] Inventors: Edward M. Halimi, 6155 Carpinteria Ave., Carpinteria, Calif. 93013; William E. Woollenweber, 3169 Camino Del Arco, Carlsbad, Calif. 92009; Ralph P. Maloof, 4527 Park Monaco, Calabasas, Calif. 91302

[21] Appl. No.: 508,442

[22] Filed: Jul. 28, 1995

[51] Int. Cl.⁶ .................................................. F02B 37/14
[52] U.S. Cl. .................. 60/608; 60/600; 60/602; 60/611
[58] Field of Search ............... 60/607, 608, 611, 60/600; 123/564

[56] References Cited

U.S. PATENT DOCUMENTS

| | | | |
|---|---|---|---|
| 4,850,193 | 7/1989 | Kawamura | 60/608 |
| 4,878,347 | 11/1989 | Kawamura | 60/608 |
| 4,882,905 | 11/1989 | Kawamura | 60/608 |
| 4,901,530 | 2/1990 | Kawamura | 60/608 |
| 5,025,629 | 6/1991 | Woollenweber | 60/611 |

FOREIGN PATENT DOCUMENTS

| | | | |
|---|---|---|---|
| 63-105222 | 5/1988 | Japan | 60/608 |
| 3-202633 | 9/1991 | Japan | 60/608 |

*Primary Examiner*—Michael Koczo
*Attorney, Agent, or Firm*—Allan M. Shapiro

[57] ABSTRACT

The motor-assisted variable geometry turbocharging system has a motor to add power to the turbocharging shaft, especially at low exhaust gas volume. Additionally, the turbocharger has control over compressor air inlet direction and/or control of exhaust gas to a two-volute expander. These are individually controlled directly or indirectly from an engine controller to enhance turbocharger performance. In a preferred embodiment, the motor is an electric motor, mounted directly on the turbocharger shaft intermediate the turbo expander and turbo compressor and within the main housing.

13 Claims, 5 Drawing Sheets

MOTOR-ASSISTED VARIABLE GEOMETRY TURBOCHARGING SYSTEM

FIELD OF THE INVENTION

The present invention relates generally to variable geometry components used in turbochargers applied to internal combustion engines that operate over a broad range of speed and load.

BACKGROUND OF THE INVENTION

Fixed geometry turbochargers can be designed to operate efficiently at a particular engine load and speed. However, when operated over a broad range of engine speed and load, the compressor and turbine components are forced to function off their design points and consequently suffer losses in efficiency that affects engine performance adversely. If the turbocharger is matched to an engine at the engine's rated speed, it will run considerably off its maximum efficiency where the engine is "torqued down" to low engine operating speeds. Conversely, if the turbocharger is matched to an engine's low speed range, the turbocharger will have a tendency to "overspeed" when the engine is operated at maximum speed and load.

To prevent overspeeding in turbochargers that have been matched to the low engine speed range, a waste gate is frequently used to bypass exhaust gas around the turbine to limit turbine speed over the high engine speed range. The waste gate, however, allows the escape of exhaust gas energy, which could be better utilized by the turbocharger turbine and results in a substantial loss in system efficiency.

A more efficient system generally known in the trade is one comprising variable geometry components in the turbocharger compressor, the turbocharger turbine, or both. The most common types are variable nozzle vanes ahead of the turbine wheel and/or variable diffuser vanes in the compressor component.

Variable nozzle vanes ahead of the turbine wheel are connected together so that the throat area of each nozzle passage can be reduced over the low engine speed range and increased as the engine speed approaches its maximum, so that the turbocharger speed is kept within a safe operating range. The positioning of the vanes must be precisely controlled by engine speed and load, and they must be freely movable in the hot exhaust gas environment with minimal leakage through clearance spaces.

The various movable devices that have been employed in the turbocharger turbine have been complicated, expensive, and subject to questionable durability. Consequently, they have met with limited commercial success.

A more practical approach to a variable device in the engine exhaust system was disclosed in U.S. Pat. No. 3,557,549 to Webster, assigned to Caterpillar Tractor Co., 1971. This system employs a flapper valve so positioned in a divided manifold system that it resides in a neutral position at high engine speed and load, but can be moved to a second position where it diverts all engine exhaust gas flow into one passage of a divided turbine casing at low engine speeds. This essentially doubles the flow of exhaust gas through the single turbine casing passage and maintains the turbocharger speed at higher levels than otherwise could be reached at low engine speeds. This device is much simpler than the complicated variable nozzle vane systems and does not require a precise control system for positioning.

The use of the flapper valve to divert exhaust gas allows the turbocharger to be matched efficiently to the higher engine speeds where the flapper is in a neutral position. When the engine is operated at low engine speeds, the diversion of full exhaust flow to the single turbine casing passage ahead of the turbine increases the turbocharger rotor speed to provide higher boost pressure to the engine cylinders, allowing the engine to produce more power and torque than otherwise could be obtained.

The increase in boost at low engine speeds produced by the diverted flapper valve might be great enough to cause the turbocharger compressor to operate in its surge or unstable area. In this case, the compressor must be rematched to move its surge line to lower air flow so that the engine operating points fall within its stable operating regime. However, this causes a movement of the compressor efficiency islands and choke area to lower flow and can result in lowering the compressor efficiency when the engine is operating at high speed and load.

A variable geometry compressor that can shift the performance map of the compressor to a lower or higher flow range is one solution to the problem of keeping the compressor out of surge at low engine speeds and still maintain high efficiency at high engine speeds. Variable diffuser vanes is one type of variable geometry compressor that could be employed, but the movable vanes cause significant mechanical complication internally in the construction of the turbocharger and must be precisely positioned by a rather elaborate control system.

A more practical type of variable geometry device is to employ movable pre-whirl vanes upstream of the compressor wheel to provide positive and negative pre-whirl to the air entering the inducer of the compressor wheel. Negative pre-whirl moves the compressor operating range to higher flow and usually improves compressor efficiency. Positive pre-whirl moves the compressor operating vane to lower flow and usually lowers compressor efficiency somewhat. However, since the maximum island of compressor efficiency is also moved to lower flow, the net effect of positive pre-whirl is to raise the level of efficiency available to the operating area of the engine.

It is thus advantageous to connect the movable flapper valve in the exhaust stream to the movable prewhirl vanes in the air stream by a mechanical linkage causing them to move in synchronization. With the flapper in neutral, the pre-whirl vanes are positioned to provide negative pre-whirl to the compressor, moving its flow range so that maximum efficiency is available in the high engine speed range. When the flapper is in the diverted position, the pre-whirl vanes are moved to the positive pre-whirl position, thereby moving the maximum compressor efficiency to the low engine speed range. A simple, hydraulic cylinder can be employed as a control means to move the mechanical linkage to either the high flow or low flow position by sensing the engine speed at which the transition is required to be made.

Both the flapper valve and the pre-whirl vanes are external from the turbocharger construction, resulting in much lower overall cost than other devices that must be built into the internal construction of the turbocharger.

The movement of the compressor flow range by utilizing positive and negative pre-whirl is more fully described in a paper published in the *Proceedings of the Institute of Mechanical Engineers,* Vol. 18943/75, titled "Experimental and Theoretical Performance of a Radial Flow Turbocharger Compressor with Inlet Pre-whirl," by Wallace, Whitfield and Atkey. It is also described in U.S. Pat. No. 5,025,629 to Woollenweber, June 1991.

At very low engine speed, for example, at low idle, there is insufficient exhaust gas energy to drive the turbocharger fast enough to produce significant levels of boost. Consequently, there is an appreciable lag time between opening of the engine throttle and when the turbocharger is running fast enough to produce enough boost pressure to eliminate smoke on acceleration, for example. Fuel control devices, such as rack limiters or aneroid controls, are employed to limit the amount of fuel delivered to the engine cylinders until the turbocharger is capable of delivering sufficient air to produce smoke-free combustion. These fuel limiting devices cause slower response to throttle opening and a sluggishness in engine and vehicle response.

SUMMARY OF THE INVENTION

In order to aid in the understanding of this invention, it can be stated in essentially summary form that it is directed to a motor-assisted variable geometry turbocharging system. The variable geometry is provided by the exhaust gas flow configuration into the exhaust gas turbine and/or the air inlet flow into the air compressor, together with a motor drive for both the turbine and compressor to enhance performance of a variable geometry turbocharging system.

It is thus a purpose and advantage of this invention to provide a motor drive for the turbo expander shaft to supply power into the turbocharger system in addition to that which can be achieved by extraction from the exhaust gas, even with a two-volute turbo expander to enhance performance, especially at low exhaust gas flow rates.

It is a further purpose and advantage of this invention to provide a motor for adding power to a turbocharger which also includes control of the air inlet to the turbo compressor, to enhance performance of the turbocharger even when it is equipped with pre-whirl vanes upstream of the compressor wheel which controls the rotation of the air as it enters the inducer of the compressor wheel, to enhance performance of such systems by providing the power necessary to provide adequate pre-whirl even at low exhaust gas flow rates.

It is a further purpose and advantage of this invention to supply power to a turbocharger which is driven by exhaust gas expansion by including a motor to supply torque to aid in rotating the shaft in the same direction as exhaust gas expansion, and to include such a turbocharging motor together with control of air flow into the turbo compressor to enhance vehicle performance.

It is a further purpose and advantage of this invention to provide a motor connected to a turbo compressor shaft and control the motor in addition to controlling exhaust gas flow to the turbine and/or air flow into the turbo compressor to enhance engine performance.

It is a further purpose and advantage of this invention to provide an electric motor, mounted directly on the turbocharger shaft intermediate the turbo expander and turbo compressor and within the main housing, so that the above-described purposes and advantages can be attained with minimum space utilization and as an item of original equipment for the vehicle manufacturer.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 4 is a schematic system similar to FIG. 3, but the exhaust gas inlet to the turbo expander is controlled by the engine controller with separate control of the control of the air inlet to the turbo compressors the motor and separate

DESCRIPTION OF THE PREFERRED EMBODIMENTS

To improve engine and vehicle response to opening of the throttle, an external power source is needed to operate the turbocharger at higher speed at engine idle in order to provide increased boost levels in the engine intake system in preparation for quick acceleration. This external power source can be any convenient rotating power source, such as an electric motor, a hydraulic motor, a pneumatic motor, or the like, and particularly a motor which can have its power output controlled. A preferred example and the example given below of an external power source is an electric motor that engages the turbocharger rotor at engine idle and increases the idle speed of rotation of the rotating assembly.

Having higher boost pressure available at engine idle speed than the boost pressure the turbocharger can provide from exhaust gas energy alone, allows fuel to be injected into the engine cylinders sooner during acceleration and reduces smoke and emissions during the transient period. The engine is able to produce more output torque during transients, and the higher boost pressure during acceleration should eliminate the need for fuel limiting devices, such as the aneroid control referred to previously.

The electric motor, coupled to the turbocharger rotor, can be energized before the engine is started. Then, during cranking of the engine, a positive differential pressure will exist across the engine from intake manifold to exhaust manifold. In the case of a two-cycle engine, a positive differential is necessary for scavenging the cylinder during cranking. Therefore, if a two-cycle engine is turbocharged with an electric motor assist, the need for a gear-driven blower to provide the scavenge differential pressure needed for starting is eliminated.

Figure 1:
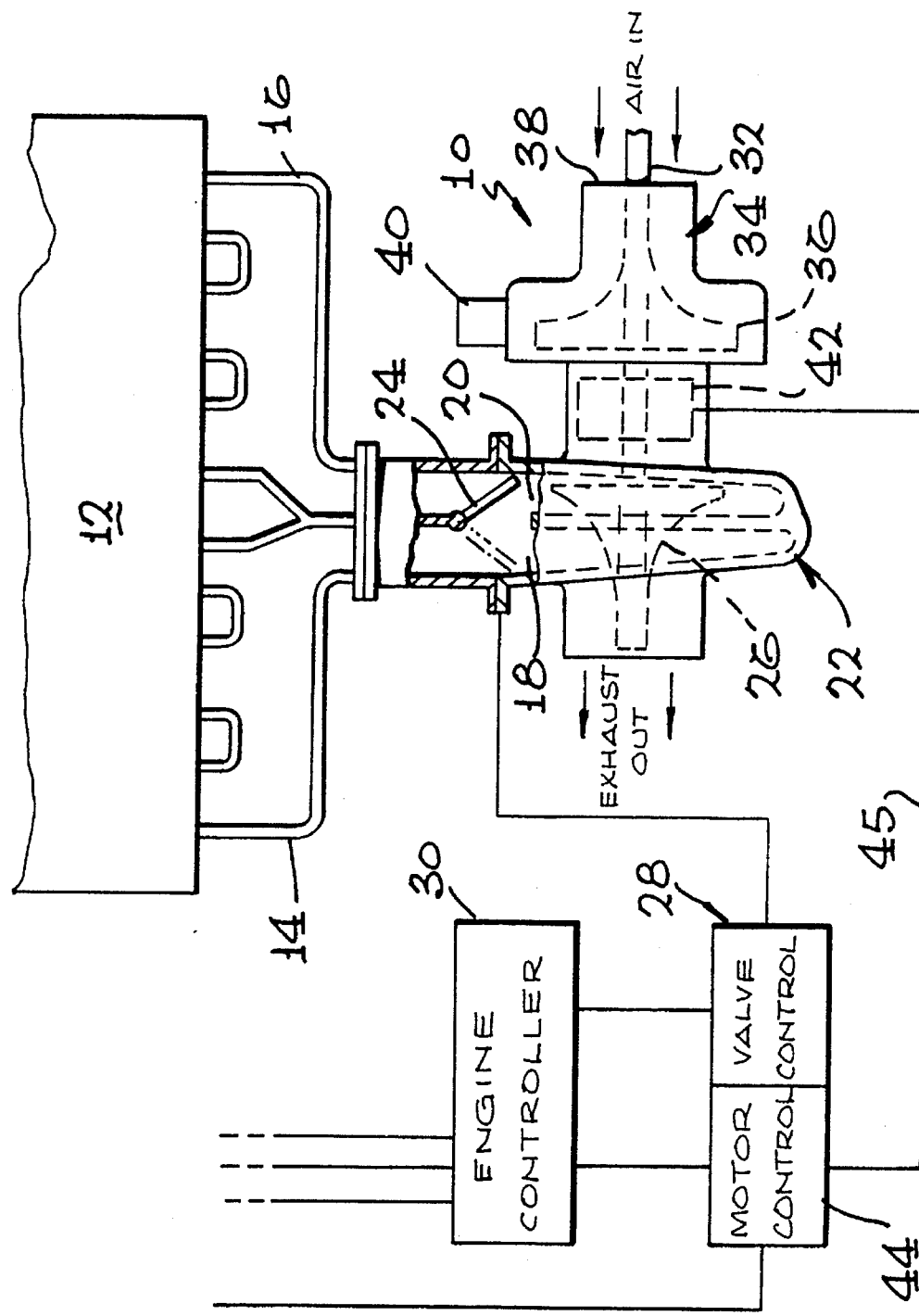
FIG. 1 is a schematic view of a turbocharging system which has a motor to add power to the shaft, and has control of exhaust gas into a two-volute turbo expander, with both the motor and the exhaust gas being controlled by an engine controller.

The motor-assisted variable geometry turbocharging system of this invention is generally indicated at 10 in FIG. 1. Diesel engine 12 has two exhaust manifolds 14 and 16 which are separately ducted to the two volutes 18 and 20 of exhaust gas turbine 22. Valve 24 controls whether or not exhaust gas is delivered to one or both volutes. When exhaust gas volume is low, delivery to one volute provides a higher exhaust gas pressure, which delivers more power to the exhaust gas turbine rotor 26. Valve 24 is controlled by valve controller 28, which responds to signals from the engine controller 30. Various signals are fed into the engine controller, such as engine demand and current engine operating conditions, so that the valve 24 can be appropriately set. The output of the engine controlled includes fuel inlet control in addition to the air inlet control in accordance with this invention.

The exhaust gas turbine rotor 26 is mounted on turbocharger shaft 32 which, in turn, drives turbo compressor 34. The turbo compressor has a compressor rotor 36 therein so that, when rotated, air is drawn into inlet 38 and is delivered to outlet 40 to the engine intake system.

Figure 9:
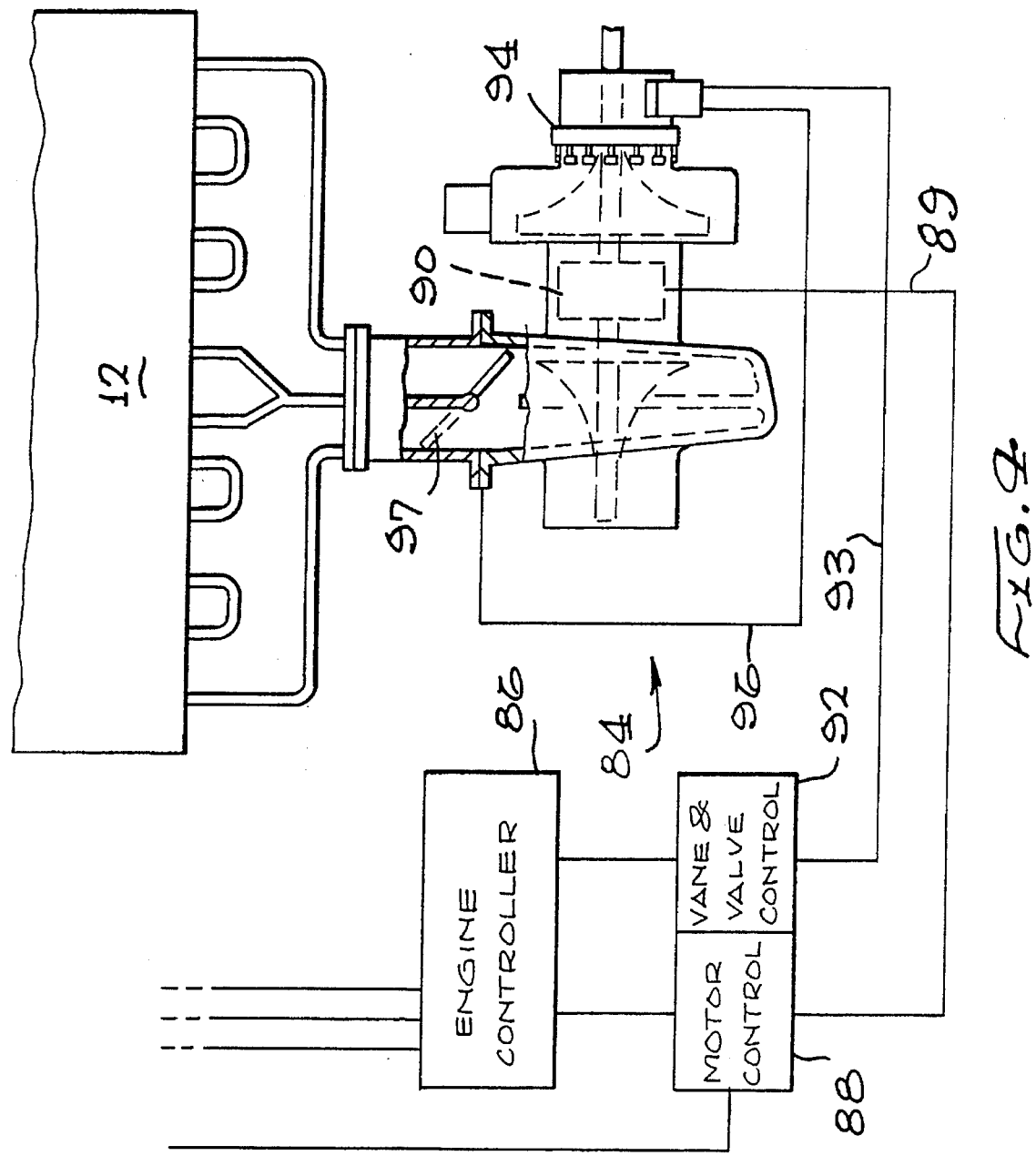

This structure is generally seen in Woollenweber U.S. Pat. No. 5,025,629, the entire disclosure of which is incorporated herein by this reference, see FIG. 9 thereof. For the reasons discussed above and in addition to the variable geometry discussed in that patent, there are problems in delivering enough combustion air to the engine 12, particularly at low exhaust gas rates. For this reason, motor 42 is attached to rotate turbocharger shaft 32 in the turbocharging direction. The motor 42 may be an electric motor, a pneumatic motor, a hydraulic motor or other type of motor, providing it can be controlled. Preferably, however, motor 42 is an electric motor, with its rotor mounted on shaft 32 and its stator mounted on the interior of the turbocharger housing, with electric control line 45 supplying the appropriate motor control signals. Motor controller 44 is connected to be managed by engine controller 30. The engine controller 30 preferably is part of the vehicle engine management system and manages the valve control and motor control for optimum operation of the system to deliver the optimum amount of combustion air to the engine in accordance with engine demand and current engine operating conditions. When the engine is operating at low speed and there is an engine demand for more power and more speed, the valve 24 is in the single-volute position and the motor 42 is energized to add power to the turbocharger. As the exhaust gas volume goes up, the valve can be switched to the double-volute position and, when exhaust gas is fully adequate to supply the entire power demand of the turbo compressor, no power need be supplied to the motor 42. If the motor 42 is configured so that it cannot be rotated as fast as the top speeds of the shaft 42, the motor 42 can be disconnected via control line 45. Thus, power is supplied to the motor 42 and the valve 24 is appropriately controlled for optimum turbocharger operating conditions under the engine speed and demand requirements.

Figure 2:
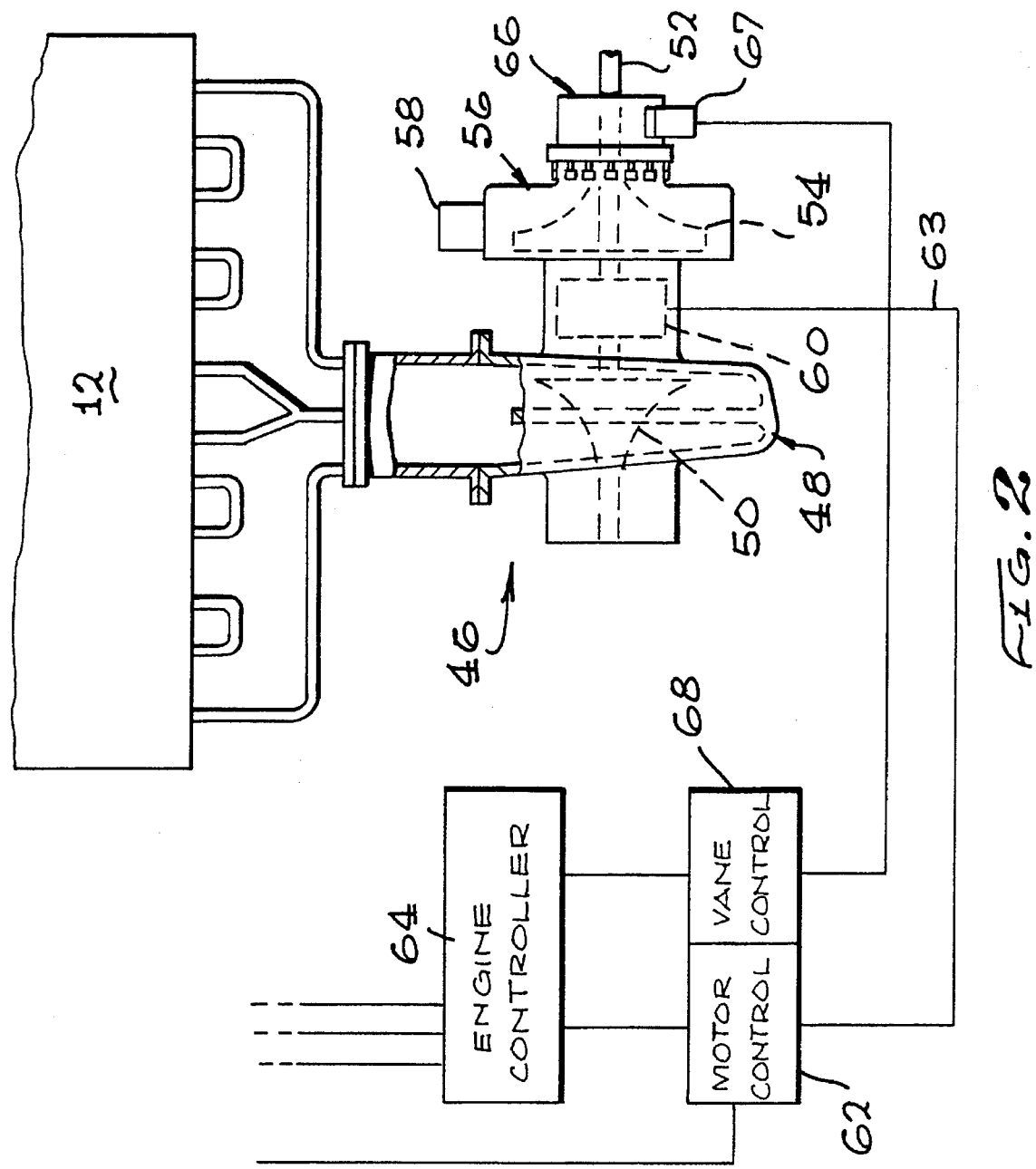
FIG. 2 is a similar view wherein the turbocharger has a motor to help power the shaft and has control of air into the compressor with control of both being accomplished from the engine controller.

FIG. 2 illustrates a similar turbocharging system 46 for a diesel engine. Turbocharging system 48 has an exhaust gas turbo expander rotor 50 mounted on turbocharger shaft 52. Compressor rotor 54 is driven by the shaft 52 and is mounted in compressor housing 56. Air is delivered from outlet 58 to the air inlet of the engine. Electric motor 60, as described with respect to motor 42, is controlled by a motor controller 62 via line 63 which, in turn, is managed by engine controller 64. The engine controller receives engine demand signals as well as current engine operating condition signals. From those signals, motor control 62 receives appropriate signals to supply power to motor 60 to drive the shaft 52 in the compressor rotation direction. Additionally, the inlet 66 of the turbocharger has adjustable vanes such as at 67 therein which provide pre-whirl to the inlet stream. As discussed in the references above, this pre-whirl enhances the compressor performance. The pre-whirl can be adjusted by appropriate adjustment of the vanes which cause the pre-whirl to adjust compressor performance. The vane control 68 thus provides variable geometry in the turbo compressor. Both the vane control 68 and the motor control 62 are managed from the engine controller 64. Each is individually adjusted to provide optimum turbocharging performance under the particular engine operating parameters and performance demands. The adjustment of turbo compressor conditions by control of input pre-whirl is discussed in the above-referenced publication.

Figure 3:
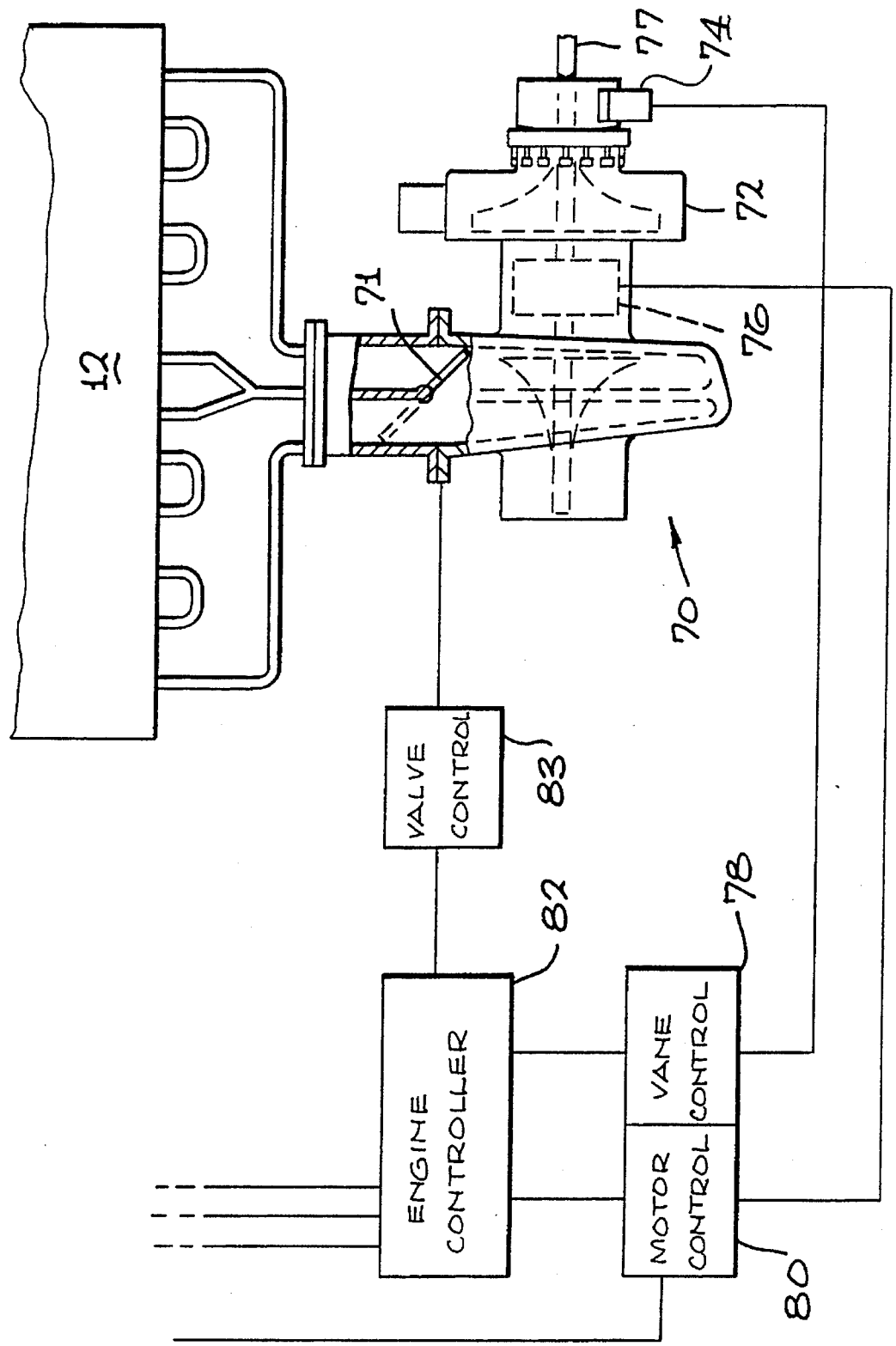
FIG. 3 is a schematic diagram similar to FIG. 1, together with rotational control of air into the turbo compressor, with all three being controlled by the engine controller.

FIG. 3 shows a turbocharging system 70 similar to the system shown in FIGS. 1 and 2. The turbocharging system 70 has a dual volute exhaust gas expander with the diverter valve 71, which diverts all exhaust gas flow from the split manifold of the engine to one volute for higher performance at low exhaust gas flow rates, as previously described. Furthermore, the compressor 72 has a pre-whirl control 74 at the air inlet to the compressor 72. Additionally, motor 76 is directly connected to the turbocharging system main shaft 77 to drive it in the compressor direction. The pre-whirl vane control 78 and the motor control 80 respectively control the pre-whirl vanes and the motor 76 but, as FIG. 3 illustrates, they are coordinated with each other to optimize cooperative turbocharger air outlet under the existing conditions. This coordination is also present in the valve control 28 with respect to motor control 44 in FIG. 1 and is also present with respect to the vane control 68 and motor control 62 in FIG. 2. The vane control 78 and motor control 80 of FIG. 3 are both energized by signals from the engine controller 82, which includes demand as well as operating parameters. Contrasted to this, the valve control 83 is operated directly from the signals available in the engine controller 82. Thus, the motor and the pre-whirl control are synchronized and coordinated, while the diverter valve 71 is independently controlled from the valve controller 83.

FIG. 4 shows a system 84 which is structurally much like the system of FIG. 3. In the controlling of the turbocharging system 84, the engine controller 86 provides signals to the motor control 88 which controls motor 90 via line 89. Coordinated therewith and cooperating therewith, controller 92 controls through line 93 both the vanes 94 which control the pre-whirl and, through line 96, controls diverter valve 97. Since the pre-whirl control also controls the diverter valve, the two functions are coordinated. Since the motor control is related to the valve control 92, all of the functions are coordinated and are adjusted in accordance with signals received from the engine controller 86.

Figure 5:
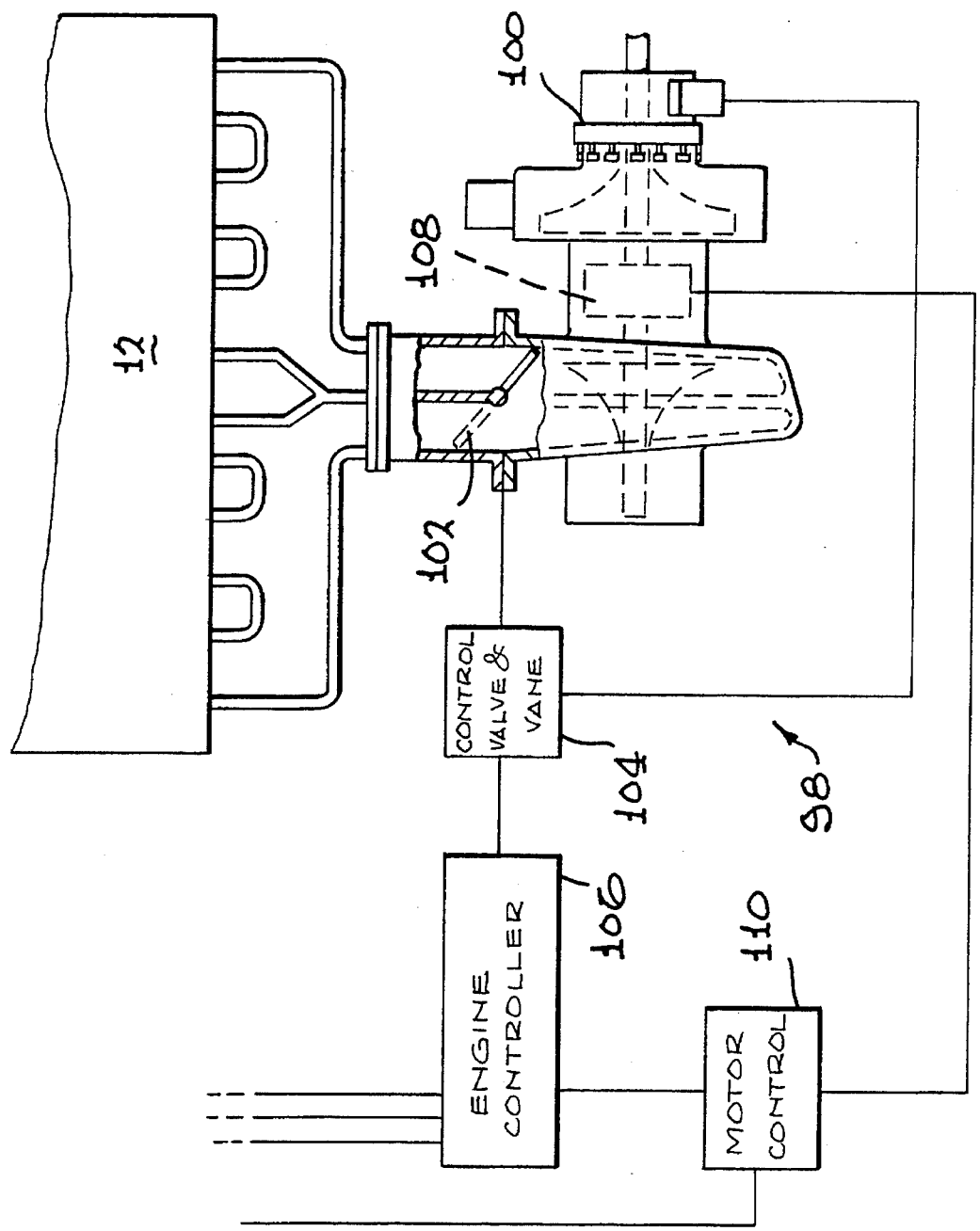
FIG. 5 is similar to FIG. 3, but the exhaust gas control and air inlet control are controlled together and the motor control is separate.

FIG. 5 shows a system 98 which is similar to the system 84 of FIG. 4 because it has all three of the turbocharging system variables. The pre-whirl vanes 100 and the diverter valve 102 are both controlled by controller 104, which receives its signals from the engine controller 106. It is seen that these two variables are cooperative and coordinated because their signal comes from the same controller 104. In this case, however, motor 108 is controlled by motor controller 110, which receives its signal directly from the engine controller 106. Thus, the pre-whirl vanes and exhaust diverter valve are coordinated and are cooperatively adjusted. The motor 108 is controlled separately from engine control signals.

The motor is sized so that it can contribute torque over a broad operating range of the turbocharging system. When the engine starts from idle, the motor is the first and largest contribution to an increase in turbocharger output. The motor remains contributing torque until the exhaust gas, in combination with the turbo compressor inlet control, can provide adequate air to prevent the engine from running too rich. However, in order to prevent too much boost, as the boost pressure goes up, the motor is turned off before the compressor inlet is controlled to reduce or limit increase in boost.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A motor assisted variable geometry turbocharging system comprising;

a turbo expander for being driven by engine exhaust gas;

a turbo compressor for drawing air in an inlet and delivering air under pressure to the engine, said turbo compressor and turbo expander being connected together to rotate together;

air inlet control vanes on said compressor air inlet for providing compressor inlet pre-whirl, said vanes being variable to control the amount of pre-whirl;

a vane control for controlling said vanes;

a motor connected to rotate with said compressor to supply power to said compressor to drive said compressor at low exhaust gas flow;

a motor control to control said motor, said motor control being connected to said vane control so that said motor and said vanes are both controlled by said motor controller; and an engine control responsive to engine conditions, said engine control being connected to said motor control.

2. The turbocharging system of claim 1 further including an exhaust gas inlet valve connected to said exhaust gas turbine, a valve control for controlling said exhaust gas inlet valve, said valve control being controlled by said engine control and being independent of said motor control and said vane control.

3. The turbocharging system of claim 1 including a turbocharger shaft, said turbo expander and said turbo compressor being mounted on said shaft, said motor being an electric motor having a rotor mounted on said shaft at a location between said compressor and said expander.

4. The turbocharging system of claim 2 including a turbocharger shaft, said turbo expander and said turbo compressor being mounted on said shaft, said motor being an electric motor having a rotor mounted on said shaft at a location between said compressor and said expander.

5. A motor-assisted turbocharging system comprising:

an exhaust gas turbine having an exhaust gas inlet duct for connection to receive exhaust gas from an internal combustion engine, said exhaust gas turbine having a rotating turbine wheel therein, said turbine wheel being mounted on a shaft to rotate therewith;

a turbo compressor, said shaft extending into said turbo compressor, said turbo compressor having an air inlet duct and having a wheel therein mounted to rotate with said shaft to compress air entering said air inlet duct;

a motor, said motor being connected to said shaft, said motor being energizable to rotate said shaft in an air-compressing direction, motor control means for controlling said motor;

inlet duct flow control means in at least one of said inlet ducts for controlling flow therethrough, said inlet duct flow control means including movable pre-whirl vanes in said compressor air inlet duct and a vane control connected to control positions of said movable pre-whirl vanes; and engine control means connected for controlling said inlet duct flow control means and said engine control means being also connected to said motor control means whereby said engine control means controls said turbocharging system for engine management.

6. The motor-assisted turbocharging system of claim 5 wherein said engine control means separately controls said inlet duct flow control means and said motor control means.

7. The motor-assisted turbocharging system of claim 6 wherein said exhaust gas turbine is a dual volute turbine and said inlet duct flow control means controls exhaust gas flow to one or both of said volutes.

8. The motor-assisted turbocharging system of claim 5 wherein said inlet duct flow control means includes a valve in said exhaust gas inlet duct to control exhaust gas flow to said exhaust gas turbine.

9. The motor-assisted turbocharging system of claim 8 wherein said exhaust gas turbine is a dual volute turbine and said inlet duct flow control means, when actuated, directs substantially all exhaust gas into one of said volutes to enhance turbine performance.

10. The motor-assisted turbocharging system of claim 9 wherein said motor is an electric motor having its rotor mounted on said shaft at a location between said compressor and said turbine wheel.

11. A motor-assisted turbocharging system comprising:

an exhaust gas turbine having an exhaust gas inlet duct for connection to receive exhaust gas from an internal combustion engine, said exhaust gas turbine having a rotating turbine wheel therein, said turbine wheel being mounted on a shaft to rotate therewith;

a turbo compressor, said shaft extending into said turbo compressor, said turbo compressor having an air inlet duct and having a wheel therein mounted to rotate with said shaft to compress air entering said air inlet duct;

a motor, said motor being connected to said shaft, said motor being energizable to rotate said shaft in an air-compressing direction, motor control means for controlling said motor;

air inlet duct air flow control means in said air inlet duct for controlling air flow therein; and engine control means connected to said air inlet duct air flow control means, and said engine control means being also connected to said motor control means whereby said engine control means controls said turbocharging system to deliver adequate air for engine requirements.

12. The motor-assisted turbocharging system of claim 11 wherein said engine control means separately controls said inlet duct flow control means and said motor control means.

13. The motor-assisted turbocharging system of claim 11 wherein said engine control means includes a valve in said exhaust gas inlet duct to control exhaust gas flow to said exhaust gas turbine.

* * * * *